United States Patent [19]

Fannin

[11] 4,018,485
[45] Apr. 19, 1977

[54] FLUID PRESSURE BRAKING SYSTEM WITH PARKING BRAKE-SERVICE BRAKE INTERLOCK

[75] Inventor: Richard C. Fannin, Elyria, Ohio

[73] Assignee: The Bendix Corporation, South Bend, Ind.

[22] Filed: Feb. 17, 1976

[21] Appl. No.: 658,213

[52] U.S. Cl. .................................. 303/13; 303/77
[51] Int. Cl.[2] ........................................ B60T 15/16
[58] Field of Search ............ 303/9, 13, 71, 75, 77, 303/89

[56] References Cited

UNITED STATES PATENTS

| | | | |
|---|---|---|---|
| 1,858,493 | 5/1932 | George | 303/77 |
| 3,228,729 | 1/1966 | Schubert | 303/89 X |
| 3,266,850 | 8/1966 | Herold | 303/52 |
| 3,273,950 | 9/1966 | Vielmo | 303/9 |
| 3,397,924 | 8/1968 | Lederer | 303/13 |
| 3,680,314 | 8/1972 | Toomey | 303/13 X |
| 3,713,702 | 1/1973 | Campaning | 303/9 |
| 3,863,992 | 2/1975 | Kurke et al. | 303/9 |

*Primary Examiner*—George E. A. Halvosa
*Attorney, Agent, or Firm*—Ken C. Decker; William N. Antonis

[57] ABSTRACT

A vehicle fluid pressure braking system is disclosed which includes brake-applying devices having separate service and parking actuators. Separate service and parking actuation circuits are provided to control actuation of the service and parking actuators, respectively. An interlocking valve is provided which prevents release of the parking actuator until a predetermined fluid pressure level is communicated to the service actuator. This interlocking valve prevents inadvertent release of the parking actuators, and also prevents release of the parking actuators in a situation in which a malfunction of the service braking circuit would render operation of the vehicle dangerous.

15 Claims, 3 Drawing Figures

FLUID PRESSURE BRAKING SYSTEM WITH PARKING BRAKE-SERVICE BRAKE INTERLOCK

SUMMARY OF THE INVENTION

This invention relates to a fluid pressure braking system for a vehicle.

One important object of my invention is to provide an interlocking valve in a vehicle fluid pressure braking system having both emergency and service braking circuits which prevents release of the vehicle parking brakes until a predetermined fluid pressure level is communicated to the vehicle service brakes.

Another important object of my invention is to prevent movement of the vehicle after application of the parking brakes if the service braking circuits malfunction.

Still another important object of my invention is to require a two-step procedure to release the vehicle parking brakes.

DETAILED DESCRIPTION

Figure 1:
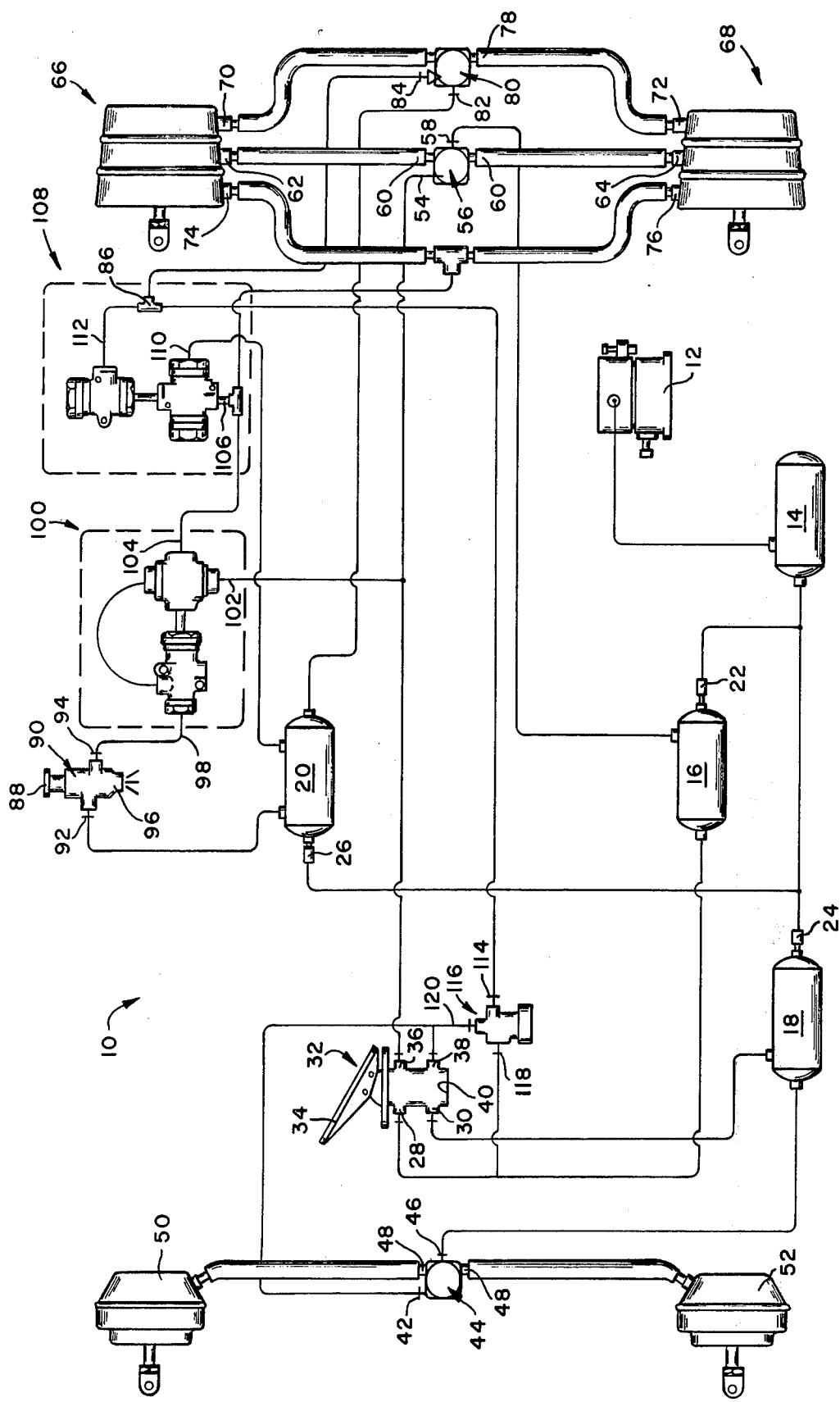
FIG. 1 is a schematic illustration of a vehicle braking system made pursuant to the teachings of my present invention.
Figure 2:
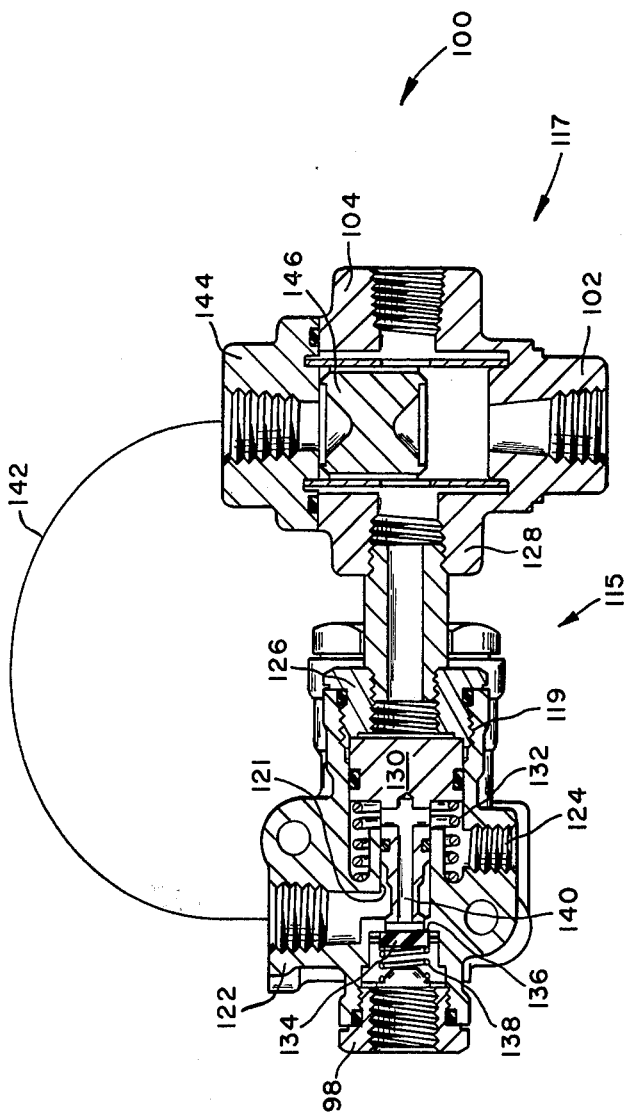
FIG. 2 is a detailed schematic illustration of a portion of a braking system illustrated in FIG. 1, and includes a cross-sectional view of one of the valves used therein.

Referring now to FIGS. 1 and 2 of the drawings, a vehicle fluid pressure braking system generally indicated by the numeral 10 includes a conventional air compressor 12 which is powered by the vehicle engine and which compresses atmospheric air to charge a supply reservoir generally indicated by the numeral 14. The supply reservoir 14 charges a primary service reservoir 16, a secondary service reservoir 18, and a parking-emergency reservoir 20. Each of the reservoirs 16, 18, and 20, are protected by a one-way check valve 22, 24, and 26 which permit fluid communcation from the reservoir 14 into the corresponding reservoirs 16, 18, and 20, but which prevent escape of fluid pressure therefrom in the reverse direction. The fluid pressure content of the reservoirs 6 and 18 is communicated to corresponding inlet ports 28, 30, respectively, of a conventional dual brake valve generally indicated by the numeral 32. The dual brake valve 32 is constructed in accordance with the teachings of U.S. Pat. No. 3,266,850, owned by the assignee of the present invention and incorporated herein by reference. When a brake application is effected by operation of the treadle 34 on the valve 32 by the vehicle operator, the inlet ports 28 and 30 are communicated to their corresponding delivery ports 36, 38, respectively. When the treadle 34 is released, the delivery ports 36, 38 are vented to atmosphere through the exhaust port 40. The delivery port 38 is communicated to a control port 42 of a conventional relay valve generally indicated by the numeral 44. The relay valve 44 may be of any conventional design well known by those skilled in the art and is provided with a supply port 46 which is communicated to the service reservoir 18 and with delivery ports 48 which are communicated to the front wheel brake actuators 50, 52. The relay valve 44 is responsive to operation of the treadle 34 to communicate a predetermined pressure level from the secondary reservoir 18 to actuators 50, 52. Since the pressure communicated to the actuators 50, 52, corresponds to the pressure communicated to the control port 42 by the brake valve 32, a modulated brake application is effected. The actuators 50 and 52 may be of any conventional design well known to those skilled in the art.

The delivery port 36 of the brake valve 32 is communicated to a control port 54 of a conventional relay valve 56 which may be identical to the relay valve 44. The supply port 58 of relay valve 56 is communicated to the primary service reservoir 16, and the delivery ports 60 of the relay valve 56 are communicated to service ports 62, 64 of service and parking actuators generally indicated by the numerals 66 and 68. Actuators 66, 68 are made pursuant to the teachings of U.S. Pat. No. 3,228,729, owned by the assignee of the present invention and incorporated herein by reference. The actuators 66, 68, in addition to their service ports 62, 64, are also provided with emergency-parking ports 70, 72 and lock ports 74, 76. The actuators 66, and 68 are adapted to effect a brake application when fluid pressure is communicated to either the service ports 62, 64 or the emergency-parking ports 70, 72. If fluid pressure is also communicated to the lock ports 74, 76, the brake actuators are released in the normal manner when the fluid pressure level at the service ports 62, 64 or at the emergency-parking ports 70, 72 is exhausted. However, if the pressure at the lock ports 74, 76 is vented when the brake application is effected, the brake application will be "locked-on", thereby providing a parking brake capability.

The ports 70, 72 of the actuators 66, 68, ae communicated to corresponding delivery ports 78 of a relay valve 80 which may be made identical to the relay valves 44 and 56. The supply port 82 of the relay valve 80 is connected to the emergency-parking reservoir 20, and the control port 84 of the relay valve 80 is connected through a double check valve 86 of conventional construction. The handle 88 of a conventional push-pull parking control valve 90 is mounted in the vehicle operator's compartment and is movable from a normal or running position, in which the supply port 92 of the valve 90 is communicated to the delivery port 94 of the latter, to a parking position in which communication between supply port 92 of the delivery port 94 is terminated and the delivery port 94 is vented to an exhaust port 96. The supply port 92 is communicated directly to the emergency-parking reservoir 20, and the delivery port 94 is communicated to the supply port 98 of an interlocking valve mechanism enclosed by the dashed lines and generally indicated by the numeral 100. The control port 102 of the valve mechanism 100 is communicated to the delivery port 36 of the brake valve 32, and the delivery port 104 of the valve 100 is communicated to the lock ports 74, 76 of the brake actuators 66 and 68. The interlock valve 100 will be described in greater detail hereinafter.

The delivery port 104 of the interlock valve 100 is also communicated to the control port 106 of a parking valve enclosed by the dashed lines and generally indicated by the numeral 108. The supply port 110 of the parking valve 108 is communicated to the emergency-parking reservoir 20, and the delivery port 112 of the valve 108 is communicated to control port 84 through the double check valve 86. The parking valve 108 is described in detail in copending U.S. patent application Ser. No. 636,384 filed Nov. 28, 1975, owned by the assignee of the present invention and incorporated herein by reference. The parking valve 108 is responsive to movement of the handle 88 of the valve 90 from the running to the parking position to communicate a predetermined fluid pressure level to the control port 84 of relay valve 80 and to immediately release this fluid pressure level. It is necessary to communicate this predetermined pressure level to port 84 when the vehicle is parked, as the actuators 66 and 68 must be actuated at the time the pressure is vented from the lock ports 74 and 76 to "lock-on" a brake application. Since the parking valve 108 forms no part of the present invention, it will not be described in detail herein.

The other side of the check valve 86 is communicated to the delivery port 114 of a standby valve generally indicated by the numeral 116. Standby valve 116 further includes a control port 118 which is communicated to the supply port 28 of the brake valve 32, and an inlet port 120 which is communicated to delivery port 38 of the brake valve 32. The standby valve is described in detail in the aforementioned copending application Ser. No. 636,384, filed Nov. 28, 1975, and is adapted to sense a failure in the primary braking circuits to enable actuation of the brake valve 32 to communicate fluid pressure to the emergency-parking ports 70 and 72 of actuators 66, 68 when a brake applications is effected. Since the standby valve 116 forms no part of the present invention, it will not be described in further detail herein.

Referring now to FIG. 2, the interlock valve 100 will be described in detail. The valve mechanism 100 includes a control valve generally indicated by the numeral 115 and a double check valve generally indicated by the numeral 117. The valve 115 includes a housing 119 defining a bore 121 therewithin which communicates with the supply port 98 and with a delivery port 122. An exhaust port 124 is provided which communicates the bore 121 with the atmosphere. The housing 119 further includes a control port 126 which is communicated directly to a delivery port 128 on the check valve 117. The delivery port 128 is common with the delivery port 104 which, as described hereinabove, is communicated to the lock ports 74, 76 of the brake actuators 66 and 68. A piston 130 is slidably mounted in the bore 121, and a spring 132 yieldably urges the piston 130 to the right viewing FIG. 2, in opposition to the pressure level at the control port 126. The left-hand end (viewing FIG. 2) of the piston 130 is adapted to engage a valve member 134 which is slidably mounted within the housing 119 and is adapted to sealingly engage a valve seating area 136 provided on the wall of the bore 121. A spring 138 yieldably maintains the valve member 134 in sealing engagement with the valve seat 136. The piston 130 is further provided with a passage 140 extending through the piston which communicates with the exhaust port 124. As can be seen from FIG. 2, when pressure level at control port 126 acting on the piston 130 generates a force less than the force generated by the spring 132, the piston 130 is urged into the position illustrated in the drawing, thereby permitting the valve member 134 to sealingly engage the valve seat 136 to terminate communication between the ports 98 and 122, and to exhaust the port 122 to atmosphere through the passage 140 and the exhaust port 124. A conduit 142 communicates the port 122 of the housing 119 with port 144 on the check valve 117. As discussed hereinabove, the port 102 of the check valve 117 which is opposite the port 144, is communicated to the outlet port 36 of the brake valve 32. A shuttle 146 is slidably mounted within the check valve 117 and is responsive to pressure differential between the ports 102 and 144 to communicate the higher of the pressures communicated to the ports 102 and 144 to outlet ports 128, 104 of the check valve 117. The check valve 117 is of a conventional construction well known to those skilled in the art and will not be further described herewithin.

MODE OF OPERATION

When the vehicle engine is started, the air compressor 12 charges the reservoirs 14, 16, 18, and 20 with compressed air. When the pressure level in the reservoir 20 attains a predetermined value, the vehicle operator operates the control handle 88 of the parking valve 90 to communicate the delivery port 94 with the supply port 92 to thereby communicate fluid pressure to the supply port 98 of the valve 115. However, since the pressure level at the control port 126 of the valve 115 is exhausted, the valve member 134 remains in sealing engagement with the valve seat 136 thereby preventing communication from the port 98 to the port 122 of the latter. However, when the treadle 34 is operated to operate the control valve 32 to effect a service brake actuation, communication is initiated between the inlet ports 28, 30 of the latter to the outlet or delivery ports 36, 38, thereby communicating fluid pressure to the actuators 50 and 52, and also communicating fluid pressure to the service ports 62, 64 of the actuators 66, 68. Since the port 102 of the check valve 117 is also communicated to the delivery port 36 and the brake valve 32, fluid pressure will be communicated to this port when a service brake application is effected. Service pressure communicated to the port 102 is greater than the fluid pressure level at port 144 since, as pointed out hereinabove, the pressure level at the port 122 of the valve 115 is at a substantially atmospheric pressure level because it is communicated to the exhaust port 124. Therefore, the high pressure fluid at the port 102 forces the shuttle 146 into the position illustrated in the drawing, to thereby communicate air at port 102 to the control port 126 of the valve 115. High pressure fluid at the port 126 urges the piston 130 to the left, viewing the Figure, thereby engaging the left-hand end of the piston 130 with the valve member 134 and thereafter urging the valve member 134 away from the valve seat 136 to thereby terminate fluid communication through the passage 140 and to initiate fluid communication between the inlet 98 and the port 122. Fluid pressure is communicated from the port 122 of the valve 115 to the port 144 of the check valve 117 and, upon release of the brake valve 32, to the control port 126 of the valve 115. Consequently, once fluid pressure is initially communicated through the valve 115, communication is permitted between the ports 98 and 122 until the control valve 90 is again moved to the parking position to vent port 98. High pressure fluid communicated through the outlet port 104, from either of the inlets 144 or 102, is communicated to the lock ports 74, 76 of the actuators 66, 68 thereby releasing the locking mechanisms to permit release of the vehicle brakes. As pointed out hereinabove, once the valve 115 is initially opened, substantially uninhibited fluid communication is permitted to the lock ports 74, 76, thereby maintaining release of the locking mechanisms, until the control valve 90 is returned to the parking position. When this occurs, the fluid pressure level at the port 98 of the valve 115 is exhausted, thereby also exhausting the fluid pressure in the control port 126 of the latter through the conduit 142 and the port 122. Therefore, piston 130 moves to the position illustrated in the drawing, thereby venting the port 122 to the exhaust port 124 and therefore exhausting the fluid pressure level communicated to the lock ports 74, 76 to prevent movement of the brake actuators 66, 68 in the brake-releasing direction. However, if the actuators 66, 68 are already in the brake-released position, parking valve 108 automatically applies, and then releases a predetermined pressure level to the parking-emergency ports 70, 72 of the brake actuators 66, 68 thereby effecting a predetermined brake application after the locking ports 74, 76 are vented. This brake application is "locked-on" thereby preventing movement of the vehicle.

DESCRIPTION OF THE ALTERNATE EMBODIMENT

Figure 3:
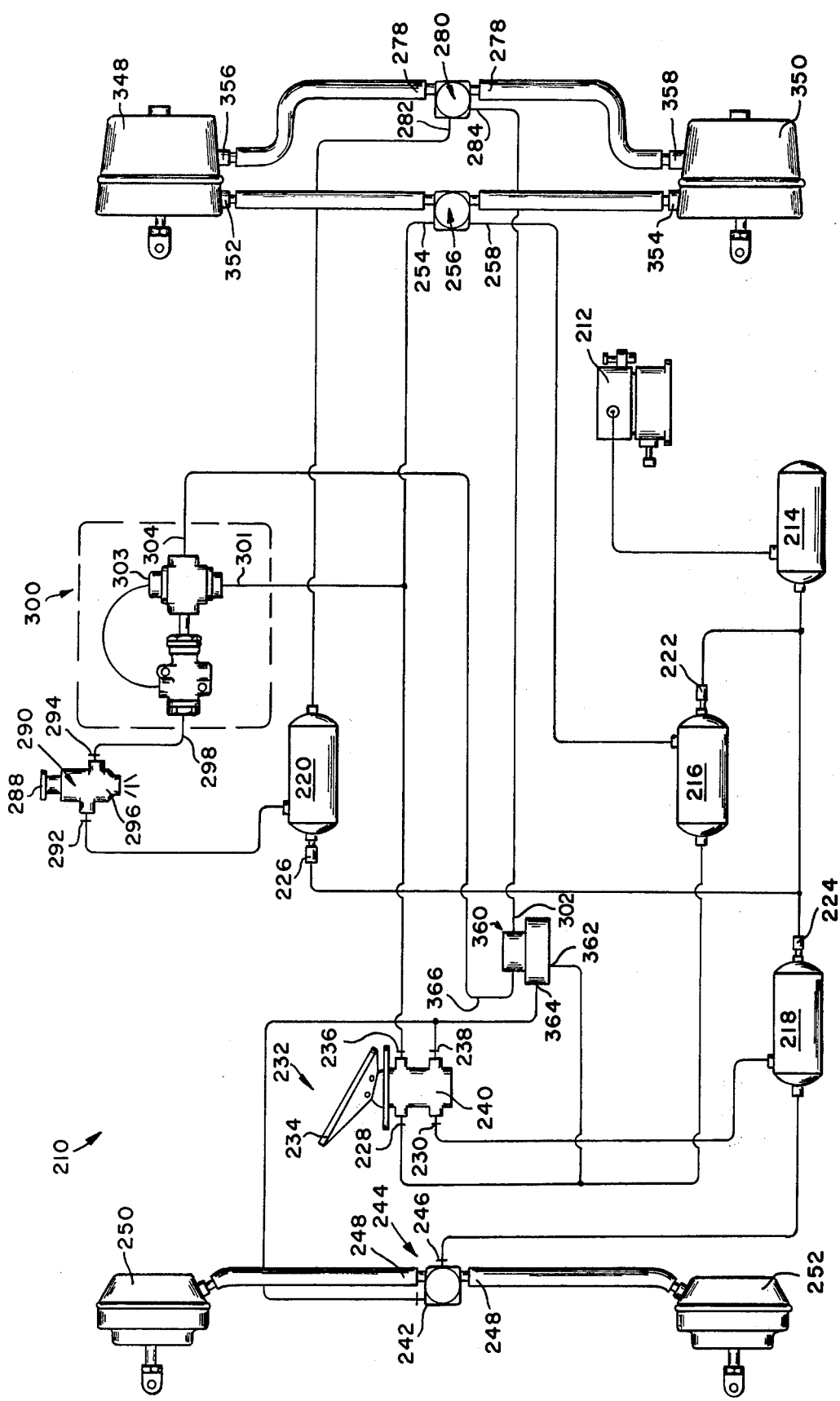
FIG. 3 is a schematic illustration similar to FIG. 1, but illustrating another embodiment of my invention.

In the alternate embodiment of FIG. 3, elements substantially the same as those in the preferred embodiment retain the same reference numerals, but are increased by 200. In FIG. 3, the actuators 66, 68 are replaced by spring brake actuators 348, 350 which are manufactured pursuant to any well known design, such as the design disclosed in U.S. Pat. No. 3,800,668, owned by the assignee of the present invention and incorporated herein by reference. The spring brake actuators 348, 350 include service ports 352, 354, and parking-emergency ports 356, 358. Of course, the brake actuators 348, 350 are responsive to fluid communication to the service ports 352, 354 to effect a service brake application in the normal manner. The spring brake actuators 348, 350 also include relatively heavy springs which normally urge the actuator into a brake-applied condition, but are "held off" by fluid pressure communicated to the parking-emergency ports 356, 358. In other words, the spring brake actuators 348, 350 are automatically applied by the spring brake mechanism unless a predetermined fluid pressure level is communicated to the parking-emergency ports 356, 358. The system disclosed in FIG. 3 further includes an inverting relay valve generally indicated by the numeral 360 which is described in detail in U.S. Pat. No. 3,863,992 owned by the assignee of the present invention and incorporated herein by reference. The valve 360 includes a control port 362 which is communicated to the primary braking circuit and therefore to the inlet port 228 of the brake valve 232, an inlet port 364 which is communicated to the secondary braking circuit and therefore to the outlet or delivery ports 238 of the brake valve 232, and a second inlet port 366 which is communicated to the delivery port 304 of the interlocking valve generally indicated by the numeral 300. The valve 360 is responsive to loss of control pressure at port 362 to permit a modulated spring brake application upon operation of the brake valve 32 to therefore effect a brake application upon failure of communication of fluid pressure to the service ports 352, 354 due to a failure in the primary service braking system. When pressure is available at the other inlet port 366, the valve 360 automatically communicates this pressure through the valve 360 to the parking-emergency ports 356, 358 to thereby provide release pressure holding off the spring brake actuators 348, 350 for normal operation of the vehicle. The interlocking valve 300 functions as described above to prevent fluid communication through the outlet port 302, and therefore to the inlet port 366, and, unless a service brake application is first effected by operation of the brake valve 232, to communicate a service brake application through the primary braking circuit.

I claim:
1. In a vehicle fluid pressure braking system having a service braking circuit and a parking braking circuit, a brake actuator having service braking means connected in said service braking circuit and communicated to a fluid pressure source when a service brake application is effected, said brake actuator including parking means connected in said parking braking circuit for holding said actuator in a brake-applied condition when a parking application is effected, an operator-actuated control valve for controlling communication in said service braking circuit, and actuable to communicate fluid pressure to said service braking means, and interlock valve means responsive to actuation of said control valve to prevent release of said parking means until said control valve is actuated to communicate a predetermined pressure level to said service braking means, said interlock valve means including means responsive to the fluid pressure level in the parking circuit to maintain release of said parking means after the control valve is released until the fluid pressure level in the parking braking circuit drops below a predetermined level.

2. The invention of claim 1:
said parking means including fluid pressure controlled locking mechanism communicated in said parking braking circuit, said locking mechanism preventing release of said actuator until a preestablished fluid pressure level is communicated to said locking mechanism, said interlock valve means preventing communication of said predetermined fluid pressure level to said locking mechanism until said predetermined pressure level is communicated to said service braking means.

3. The invention of claim 1:
said parking means including resilient means yieldably urging said actuator toward a brake applied condition and fluid pressure responsive means communicated in said parking circuit and responsive to a preestablished pressure level to oppose said resilient means, to thereby release said parking means, said interlock valve means preventing communication of said predetermined pressure level to said fluid motor means until said predetermined pressure level is communicated to said service braking means.

4. The invention of claim 1:
said interlock valve means including a vent port, an inlet port connected in said parking circuit, an outlet port connected to said parking means, and a control port adapted for communication in said service braking circuit, said valve means being responsive to the pressure level at said control port to shift from a first condition preventing communication between said inlet and outlet ports and communicating said outlet port to said vent port to a second condition communicating the inlet to the outlet and closing said vent port when the pressure level at said control port exceeds a predetermined value.

5. The invention of claim 4; and
means associated with said interlock valve means to maintain pressure communication to said control port after shifting of said interlock valve means to said second condition until the pressure level communicated to said inlet port drops below a predetermined level.

6. The invention of claim 1:
said interlock valve means including inlet and outlet ports connected to said parking circuit, a control port connected in said service braking circuit, and a pressure differential responsive valve means connected to said control port, said pressure differential responsive valve means comparing the pressure level at said outlet port with the pressure level in said service braking circuit and communicating the greater of said pressure levels to said control port.

7. The invention of claim 6:
said pressure differential responsive valve means being communicated to said parking means and communicating the pressure level communicated to said control port to said parking means.

8. The invention of claim 6:
said pressure differential responsive valve means having a first port communicated to said control port, a second port communicated to said parking means, a third port communicated to said outlet port, a fourth port communicated to said service braking circuit, and valve means comparing the pressure level at said third port with the pressure level at said fourth port and communicating the higher of said pressure levels at said third and fourth ports to each of said first and second ports.

9. In a vehicle fluid pressure braking system having a service braking circuit and a parking braking circuit, a brake actuator having service braking means connected in said service braking circuit and communicated to a fluid pressure source when a service brake application is effected, said brake actuator including parking means connected in said parking braking circuit for holding said actuator in a brake-applied condition when a parking application is effected, and interlock valve means responsive to the fluid pressure level communicated to said service braking means to prevent release of said parking means until a predetermined pressure level is communicated to said service braking means, said interlock valve means including a vent port, an inlet port connected in said parking circuit, an outlet port connected to said parking means, and a control port adapted for communication in said service braking circuit, said valve means being responsive to the pressure level at said control port to shift from a first condition preventing communication between said inlet and outlet ports and communicating said outlet port to said vent port to a second condition communicating the inlet to the outlet and closing said vent port when the pressure level at said control port exceeds a predetermined value, pressure differential responsive valve means connected to said control port, said pressure differential responsive valve means comparing the pressure level at said outlet port with the pressure level in said service braking circuit and communicating the greater of said pressure levels to said control port.

10. The invention of claim 9:
said pressure differential responsive valve means being communicated to said parking means and communicating the pressure level communicated to said control port to said parking means.

11. The invention of claim 9:
said pressure differential responsive valve means having a first port communicated to said control port, a second port communicated to said parking means, a third port communicated to said outlet port, a fourth port communicated to said service braking circuit, and valve means comparing the pressure level at said third port with the pressure level at said fourth port and communicating the higher of said pressure levels at said third and fourth ports to each of said first and second ports.

12. The invention of claim 11:
said parking means including fluid pressure controlled locking mechanism communicated in said parking braking circuit, said locking mechanism preventing release of said actuator until a pre-established fluid pressure level is communicated to said locking mechanism, said interlock valve means preventing communication of said predetermined fluid pressure level to said locking mechanism until said predetermined pressure level is communicated to said service braking means.

13. The invention of claim 11:
said parking means including resilient means yieldably urging said actuator toward a brake-applied condition and fluid pressure responsive means communicated in said parking circuit and responsive to a predetermined pressure level to oppose said resilient means, to thereby release said parking means, said interlock valve means preventing communication of said predetermined pressure level to said fluid motor means until said predetermined pressure level is communicated to said service braking means.

14. The invention of claim 9:
said parking means including fluid pressure controlled locking mechanism communicated in said parking braking circuit, said locking mechanism preventing release of said actuator until a pre-established fluid pressure level is communicated to said locking mechanism, said interlock valve means preventing communication of said predetermined fluid pressure level to said locking mechanism until said predetermined pressure level is communicated to said service braking means.

15. The invention of claim 9:
said parking means including resilient means yieldably urging said actuator toward a brake-applied condition and fluid pressure responsive means communicated in said parking circuit and responsive to a predetermined pressure level to oppose said resilient means, to thereby release said parking means, said interlock valve means preventing communication of said predetermined pressure level to said fluid motor means until said predetermined pressure level is communicated to said service braking means.

* * * * *